United States Patent [19]

Stellato

[11] Patent Number: 4,674,731

[45] Date of Patent: Jun. 23, 1987

[54] APPLIANCE REPAIR TILT STAND

[76] Inventor: Richard J. Stellato, 9628 SE. Woodstock Ave., Portland, Oreg. 97266

[21] Appl. No.: 824,505

[22] Filed: Jan. 31, 1986

[51] Int. Cl.⁴ .......................... B23Q 1/04; B23Q 1/12; B25B 1/22

[52] U.S. Cl. ........................................ 269/79; 29/559; 248/166; 248/351; 248/457; 269/296; 269/901

[58] Field of Search .................... 29/559; 269/79, 296, 269/901; 248/447, 457, 455, 456, 462, 133, 351, 166

[56] References Cited

U.S. PATENT DOCUMENTS

| | | | |
|---|---|---|---|
| 620,078 | 2/1899 | Ray | 248/351 |
| 758,866 | 5/1904 | Sherwood | 248/133 |
| 1,257,442 | 2/1918 | Zimlich | 248/133 |
| 2,274,794 | 3/1942 | Kitchen | 248/351 X |
| 2,655,335 | 10/1953 | Johnson | 248/166 |
| 2,756,954 | 7/1956 | Whitlow | 248/133 X |
| 3,022,995 | 2/1962 | Sorenson et al. | 269/296 X |
| 3,041,064 | 6/1962 | Hild | 269/296 X |
| 3,047,286 | 7/1962 | Kinne | 269/79 X |
| 3,726,501 | 4/1973 | Trentmann | 248/351 |
| 4,534,188 | 8/1985 | Fey | 312/272 X |

FOREIGN PATENT DOCUMENTS

| | | | |
|---|---|---|---|
| 351032 | 8/1937 | Italy | 269/296 |

*Primary Examiner*—Charlie T. Moon

*Attorney, Agent, or Firm*—Olson and Olson

[57] ABSTRACT

An appliance tilt stand for releasably supporting a washing machine or other appliance in a forwardly tilted, secure position during servicing, comprises a base configured to be disposed on a floor surface and slid underneath an appliance to a point determined by the abutment of a stop member on the base with the inside lower front frame of the appliance. The base also mounts, a spaced distance rearwardly of the stop member, an elongated, pivotal support arm mounting a hook arranged to engage and support the rear bottom frame of an appliance in a secure, elevated position above the base of the stand, the base supporting the front lower edge of the appliance when its rear end is being supported by the pivotal arm.

5 Claims, 4 Drawing Figures

APPLIANCE REPAIR TILT STAND

BACKGROUND OF THE INVENTION

This invention relates to devices for assisting in the servicing of major appliances, and more particularly to a novel servicing support stand arranged to engage a washing machine or like appliance to safely and reliably hold it in a forwardly tilted position necessary for easy access to the internal mechanism of the appliance from the rear and underside for servicing and repair.

The applicant is knowledgeable in the practice of in-home and in-shop servicing of appliances such as washing machines and the like, and is aware of no servicing stand that is arranged to safely and securely support a washing machine in a forwardly tilted condition to facilitate repairs to the mechanism. To the contrary, as is well known in the art, repair personnel typically lean a heavy washing machine against a dryer, a wall, blocks, counter, sink or other stationary object during servicing, often causing damage to the supports used and to the appliance itself. As also is known in the art, when a washing machine is tilted in the manner needed, the entire machine is balanced precariously on its front lower edge, whereupon the machine often falls forward or backward causing damage and possibly even injury to the serviceman. In view of the frequent occurrence of water spills and transmission oil leakage associated with washing machines and other appliances in need of repair, the incidence of inadvertent slippage and falling of the machines being repaired is even increased.

Necessarily, there is a need present in the art to reliably overcome the previously described problems associated with the repair of these machines. Toward this end, the applicant has developed an appliance repair support stand that has been found to fulfill the need that is felt by the industry, and maximizes safety and reliability.

No device that is specifically pertinent to the present invention is known by the applicant, although U.S. Pat. Nos. 4,534,188; 758,866 and 620,078 illustrate closest art of interest.

SUMMARY OF THE INVENTION

In its basic concept the appliance repair support stand of this invention provides a base arranged to be placed on a floor surface and slid underneath an appliance, the base supporting, immovably, the front lower edge of a forwardly tilted appliance, and the base mounting an elongated, pivotal support arm configured to engage the appliance frame at the lower rear strengthened portion thereof to releasably hold the rear end of the appliance securely in an elevated position above the base.

It is by virtue of the foregoing basic concept that the principle objective of this invention is achieved; namely, the provision of a portable and easily operable appliance servicing tilt support stand that is configured and arranged to safely and reliably maintain an appliance in a forwardly tilting position for servicing.

Another object of this invention is the provision of an appliance servicing tilt support stand of the class described which facilitates appliance repair, reduces the occurrence of property damage during servicing, eliminates the chance of personal injury to repair personnel as the result of slipping and falling machines, and assures the stability of the machine while repair work is being conducted.

Another object of this invention is the provision of a servicing stand of the class described which is of simplified construction for economical manufacture, reliability and ease of operation.

The foregoing and other objects and advantages of the present invention will appear from the following detailed description, taken in connection with the accompanying drawings of a preferred embodiment.

DESCRIPTION OF THE PREFERRED EMBODIMENT

Figure 4:
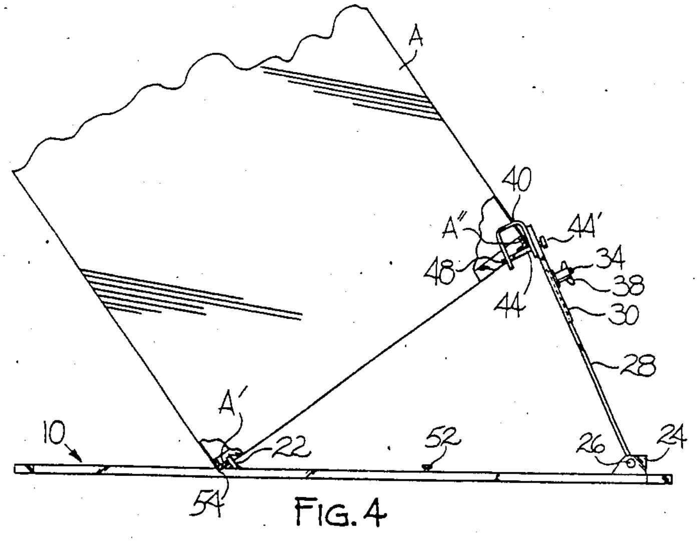
FIG. 4 is a fragmentary side elevation of the support stand of this invention shown in operational condition engaging a typical washing machine and supporting it immovably in servicing position.

An appliance servicing tilt support stand embodying the features of this invention is illustrated in the drawings, and is configured in this embodiment to engage a typical washing machine A and support it, (as seen in FIG. 4), in a position of forward tilt approximating 45° relative to normal. This approximate position of tilt has been found by the industry to be advantageous for machine repair for various known reasons.

Heretofore, any convenient upright that has been available in the vicinity has normally been used by service personnel to lean the machine against for support. For reasons detailed earlier, this approach has been found unsuitable, and often times dangerous.

The appliance stand of this invention comprises an elongated base identified generally by reference numeral 10. In the embodiment illustrated, the base is formed of a plurality of channel shaped frame members arranged to provide front end 12, rear end 14, lateral sides 16 and center beam 18 with forward reinforcing angle braces 20. The side members 16 are arranged with the channel facing upward and the remaining members arranged with the channel facing downward. The base is flat and has a relatively thin profile, as seen best in the side elevations, for purposes which will become apparent later. The width of the base is sufficient to provide stability against lateral rocking or tipping when disposed on a floor surface and supporting the machine, and is further configured to be rigid against any longitudinal bending or twisting.

As shown, the center beam 18 and braces 20 of the base mounts, preferably a spaced distance rearwardly of its forward end 12, an appliance back-up stop member 22 which forms an abutment for the inside edge of the lower forward edge A' (FIG. 4) of an appliance frame, as will be understood later.

The opposite end of the center beam of the base mounts, preferably forwardly of the rear end 14, a support bar pivot mount 24. This mount provides support for pivot pin 26 by which an elongated appliance support bar 28 is attached pivotally to the base for arcuate movement above the center beam 18.

The elongated, pivotal support bar 28 includes, at its end opposite its pivot pin 26, clamping means configured to releasably engage the strengthened rear bottom frame A" of an appliance. The clamping means illustrated in this embodiment comprises an elongated U channel 30 configured to slidably overlie the outer terminal end portion of the support bar 28. As shown, this channel includes a slot 32 provided through its top surface for registry with a bolt 34 extending through the support bar. A washer 36 is slipped onto the bolt and a wing nut 38 is threaded onto the bolt, whereby to releasably clamp the U channel 30 against movement along the support bar 28. In this manner, the U channel may be adjusted longitudinally along the bar 28 by a distance defined by the length of the slot 32, whereby it may be releasably secured in the desired position of extension by tightening the wing nut on the clamping bolt.

Figure 1:
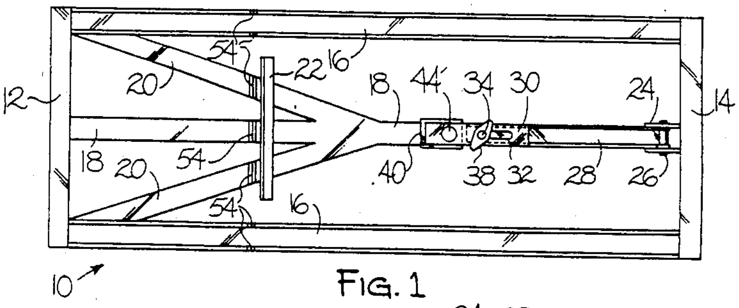
FIG. 1 is a plan view of an appliance servicing stand embodying the features of this invention, the stand being shown in a non-operational condition for portability.
Figure 2:
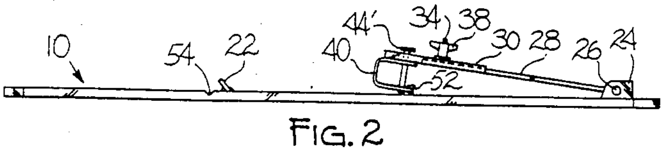
FIG. 2 is a side elevation of the support device as viewed from the bottom in FIG. 1.
Figure 3:
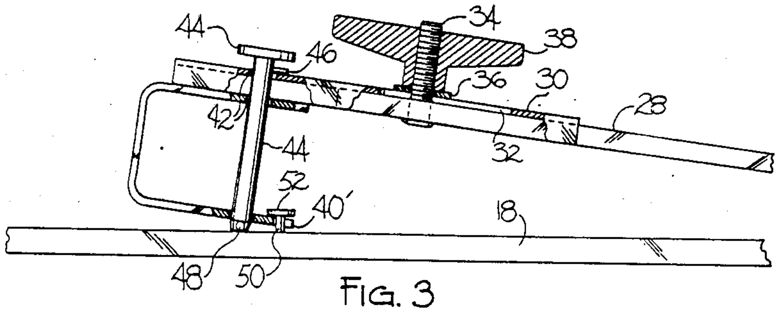
FIG. 3 is a fragmentary enlarged side elevation of the outer terminal end of the support arm of the stand of FIG. 2, parts being broken away to show internal detail.

The U channel 30 mounts, adjacent its outer terminal end, as best shown in FIG. 3, a clamp bracket 40 configured to engage the rear end of a washing machine or other appliance, preferably utilizing the strengthened bottom rear frame A" of the appliance, as viewed in FIG. 4. In the embodiment illustrated, this bracket 40 comprises a channel, U-shaped in cross-section to form a hook, mounted fixedly to the underside of the adjustable channel 30. In this manner the hook may be provided movement longitudinally along the bar 28 in order to adjust its position to facilitate its proper attachment to the appliance frame, as will become apparent later.

Means is provided to assure retention of the frame A" of an appliance within the confines of the hook 40. In this regard, the channel 30 and the hook are provided with aligned holes 42 through their walls arranged to receive a removable safety pin 44 configured to prevent inadvertent separation of the hook from the appliance frame A".

As shown, the safety pin is provided with a laterally projecting stud 46 adjacent its headed end 44' arranged to abut the channel 30 when the pin is installed, to limit the extension of the pin through the holes 42. This insures that the headed end 44' of the pin is accessible for gripping by the fingers. The opposite end of the safety pin projecting through the bottom leg of the hook 40 is provided with a diametrical bore for the removable reception of a cotter pin or other type of keeper 48. The keeper prevents inadvertent removal of the safety pin and consequent loss of the appliance frame from engagement within the confines of the hook.

Means may be provided to releasably lock the arm 28 to the base 10 for storage and transportation when not in use. In the embodiment illustrated, the center beam 18 of the base mounts a projecting stud 50 configured with an enlarged head 52 arranged to provide a catch for engaging a notch 40' in the hook 40 to releasably secure the support arm 28 to the base when not in use. To secure the arm, the wing nut 38 is loosened, allowing the hook 40 to be extended on the arm 28, whereupon the arm is pivoted to a position in which the hook rests on the center beam 18 of the base. The adjustable channel 30 is slid inwardly to bring the hook into abutment with the stud 50 under the head 52, whereupon the wing nut 38 is again tightened to prevent further sliding of the hook along the bar. The hook is thus captured by the projecting head 52 of the stud until the wing nut is again loosened and the channel 24 mounting the hook is extended, separating the hook from its capturing stud.

Means may be provided, as shown, to engage the front lower edge A' of the tilted appliance to assure against its inadvertent slippage on the base. In this regard, the base includes, as illustrated, a plurality of transverse grooves 54 in the frame members 16, 18 and 20 disposed forwardly of the transverse stop member 16. The grooves 54 are arranged to receive the lower forward edge A' of an appliance. With the appliance thus resting in the laterally extending grooves, and the weight of the appliance being considerable, the appliance is held securely against slipping on the base.

Alternatively, the base forwardly of the stop member 16 may mount a pad of friction or anti-skid material upon which the front edge of the appliance may rest, or the base may support a raised bar against which the appliance front bottom edge may rest. These and other conventional means for preventing inadvertent slippage of the appliance on the base may be used as needed or desired for any particular application.

With an appliance such as a washing machine disposed on a floor surface and access to the rear of the machine provided, the operation and use of the appliance tilt stand described hereinbefore is as follows: The stand is placed on a floor behind the washing machine, and the support arm 28 is unlocked from its storage position and pivoted rearwardly to an angle preferably greater than 90° relative to the base. The appliance is tilted slightly forward in order to allow the forward end 12 of the base and the stop member 16 to clear the rear frame member A" of the appliance. The base then is slid forwardly fully under the appliance until the stop member 16 abuts the inside edge of the lower front frame A' of the appliance, thereby positioning the base of the tilt support stand properly under the appliance. The appliance is then tilted further forward, whereupon its front lower edge engages the grooves 54 and the appliance cannot slide inadvertently on the base. In this position, the front legs (not shown) of the appliance are partly or fully off of the floor, and the weight of the machine is being carried fully by the base 10.

When the machine is tilted to a position in which it is angled forwardly, generally between about 35°-55° and preferably about 45°, the support arm 28 is pivoted forwardly and the hook 40 is extended outwardly on the arm so that it will enter through the open back wall of the appliance. Continued forward tilting of the appliance will cause the rear lower frame A", as it moves upward, to become captured within the confines of the U-shaped hook 40. When the rear frame member A" is captured by the hook, the wing nut 38 is tightened to lock the hook in position. The safety pin 44 then is inserted through the aligned bores 42, capturing the strengthened appliance rear frame member securely within the confines of the now closed and locked hook. The keeper 48 is slipped through the hole in the inner end of the pin 44 to prevent inadvertent retraction of the pin. The appliance is thus held immovably in a secure, tilted position resting on the base.

Once servicing is complete, the appliance is tilted forwardly in order to release tension on the safety pin 44 which is then removed. The machine is then lowered slightly so that the frame A" clears the hook member 40, and the arm 28 is pivoted away. The machine is allowed to pivot downwardly so as to allow the front legs to again support the machine on the floor surface. The support stand now may be slid rearwardly out from under the appliance, whereupon the appliance then is lowered fully onto its rear legs. The pivotal support arm 28 of the tilt stand may then be locked into inoperative, transportation condition, utilizing the stud head 52 described previously, until the stand is again ready for use.

From the foregoing it will be apparent to those skilled in the art that the appliance stand of my invention affords the industry a simple to use, reliable device which facilitates appliance repair and affords the user a safe alternative to the precarious and unreliable methods previously used in supporting appliances during repair. Also from the foregoing, it will be apparent to those skilled in the art that various changes, other than those previously described, may be made in the size, shape, type, number and arrangement of parts described hereinbefore, without departing from the spirit of this invention and the scope of the appended claims.

Having thus described my invention and the manner in which it may be used, I claim:

1. An appliance tilt stand for use in supporting an appliance to be serviced, the tilt stand comprising:

(a) an elongated base configured to be slid under an appliance to be serviced, (b) an appliance stop member on the base disposed inwardly of one longitudinal end thereof, the stop member arranged to abut a front lower frame of an appliance positioned over the base.

(c) elongated support arm means pivotably connected at one of its ends to the base inwardly of the other longitudinal end thereof, and (d) appliance frame engaging means on the support arm opposite its connection to said base, the engaging means configured to engage a rear lower frame of an appliance and arranged to support said rear bottom frame of the appliance securely in an elevated position above the base.

2. The appliance tilt stand of claim 1 including appliance engaging means on the base forwardly of said stop member arranged to engage the lower forward frame of an appliance for supporting the appliance against slippage on the base.

3. The appliance tilt stand of claim 1 wherein said appliance frame engaging means comprises an open ended hook configured to engage the rear lower frame of an appliance and to hold it securely in an elevated position above the base.

4. The appliance tilt stand of claim 3 wherein the base mounts a hook engaging lock means configured to releasably engage said hook when not in use to secure the support arm against the base for storage and transportation.

5. The appliance tilt stand of claim 1 wherein the appliance frame engaging means is mounted on the support arm for longitudinal movement thereon, and locking means interconnects the frame engaging means and the support arm to releasably secure the arm in a desired position of longitudinal adjustment relative to the other.

* * * * *